C. C. FARMER.
SYNCHRONOUS PRESSURE CONTROLLING DEVICE.
APPLICATION FILED DEC. 27, 1910.
1,057,481.
Patented Apr. 1, 1913.
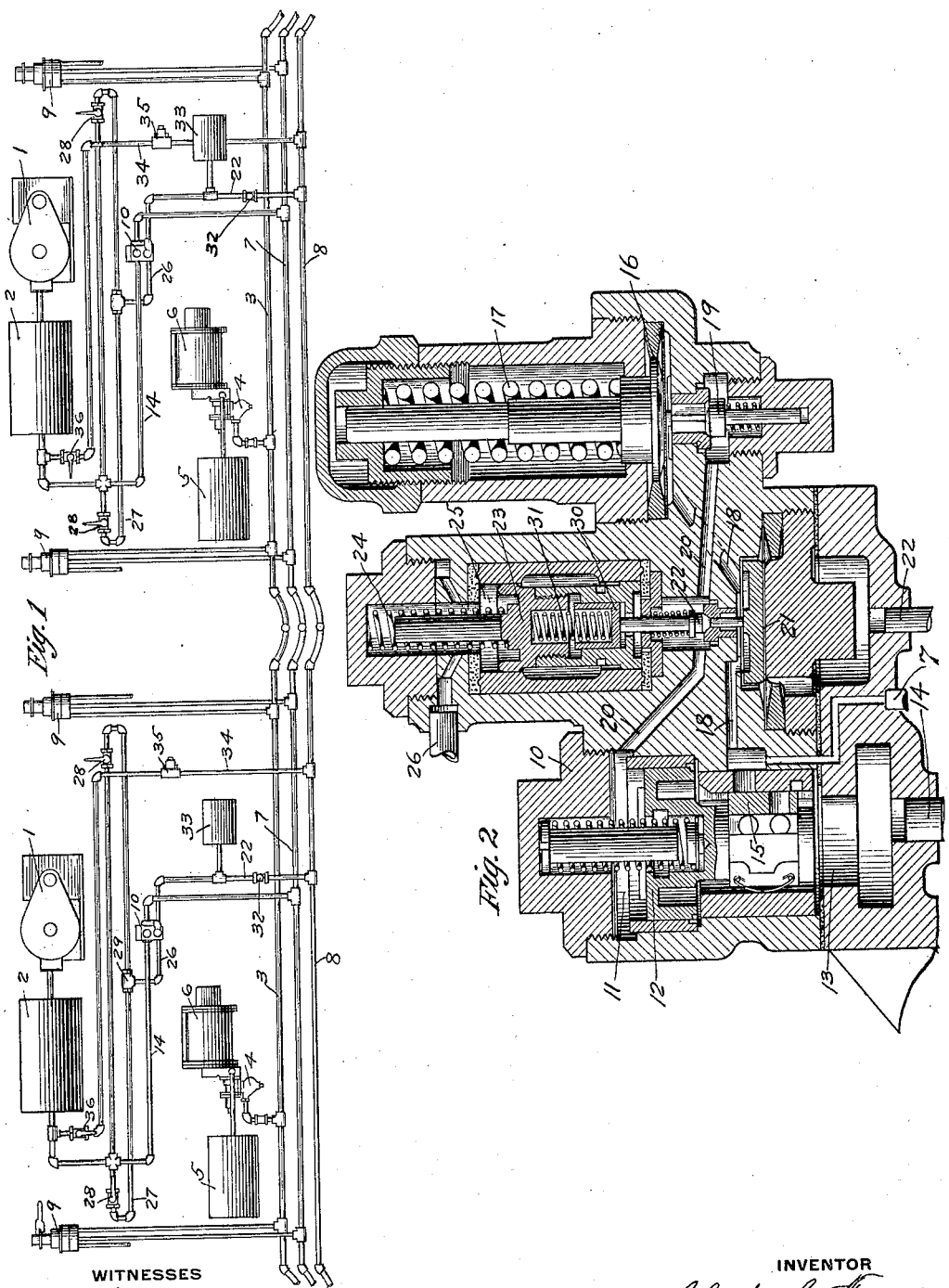
WITNESSES
INVENTOR
Clyde C. Farmer
by Wm. M. Cady
Att'y.

UNITED STATES PATENT OFFICE.

CLYDE C. FARMER, OF CHICAGO, ILLINOIS, ASSIGNOR TO THE WESTINGHOUSE AIR BRAKE COMPANY, OF PITTSBURGH, PENNSYLVANIA, A CORPORATION OF PENNSYLVANIA.

SYNCHRONOUS PRESSURE-CONTROLLING DEVICE.

1,057,481.

Specification of Letters Patent.

Patented Apr. 1, 1913.

Application filed December 27, 1910. Serial No. 599,561.

*To all whom it may concern:*

Be it known that I, CLYDE C. FARMER, a citizen of the United States, residing at Chicago, in the county of Cook and State of Illinois, have invented new and useful Improvements in Synchronous Pressure-Controlling Devices, of which the following is a specification.

This invention relates to fluid pressure controlling devices and is in the nature of an improvement upon the construction covered in Patent No. 1,031,173, dated July 2, 1912.

Apparatus embodying my invention is adapted more particularly to be employed in connection with equipments now commonly applied to electric traction cars and comprising an air compressor, a main reservoir, a control pipe line adapted to be supplied with fluid under pressure from the main reservoir through a feed or reducing valve device at a predetermined degree of pressure less than the maximum main reservoir pressure, a train brake pipe leading from the brake valve, and an automatic brake equipment having the usual brake cylinder, triple valve, and auxiliary reservoir and adapted to be operated by variations in the train brake pipe pressure. Where two or more cars so equipped are connected up in a train, the train brake pipe and the control pipe line are connected by couplings with similar pipes on the adjacent car and by manipulating the brake valve on the head car, air is taken from the control pipe line to recharge the train brake pipe and maintain the pressure therein against leakage.

In order to avoid excessive operation of any one compressor it is highly desirable that each compressor, on the cars so equipped, should supply its proportionate amount of air to maintain the pressure in the control pipe line when air is supplied therefrom to the train brake pipe and this is one of the objects of the construction covered in my patent hereinbefore referred to.

The apparatus shown in this patent comprises broadly a main supply valve, a piston for operating said valve to supply fluid from the main reservoir to the control pipe line, a regulating valve for releasing fluid from one side of said piston for operating same, and a diaphragm subject to the opposing pressures of the control pipe line and a substantially constant fluid pressure, such as that of the signal pipe line, for operating said regulating valve.

By employing a regulating diaphragm on each car which is subject to the same constant pressure on all cars, it will be seen that when the control pipe line pressure is reduced all of the feed valves throughout the train are operated simultaneously to supply fluid from the corresponding main reservoir to the control pipe line. Thus every compressor operates to furnish its quota of air and excessive operation of any one compressor is avoided. In releasing the brakes after an application, however, it may happen that air is taken from the control pipe line at such a high rate through the brake valve on the leading car as to cause the control pipe line pressure on said car to drop faster and to a lower degree than the pressure in the control pipe on the other cars and as the close proximity of the leading feed valve to the brake valve causes this feed valve to be effected by the low control pipe pressure, a larger quantity of air is discharged from the leading main reservoir than from any of the others, thus tending to cause excessive compressor operation on the leading car.

The principal object of my present invention is to obviate the above difficulty and for this purpose I provide means for increasing the load on the regulating diaphragm of the feed valve device on the leading car, so that this particular feed valve device shuts off at a control pipe pressure a few pounds less than the normal pressure. Thus the completion of the recharge of the train pipe and auxiliary reservoir is effected by the compressors on the other cars and excessive operation of the compressor on the leading car is prevented. Furthermore, the feed valve device on the leading car requiring a greater drop in pressure in the control pipe to open same than on the other cars, it will be evident that this leading feed valve will not open to supply ordinary train brake pipe leakage, but that such leakage will be provided for by the operation of the other feed valves.

In the accompanying drawing; Figure 1 is a diagrammatic view showing the air brake equipment of two cars coupled together with my improvement applied thereto; and Fig. 2 a sectional view of a feed valve device embodying my invention.

As shown in Fig. 1, the equipment for each car comprises a motor-driven air compressor 1 for supplying air to a main reservoir 2, a train pipe 3, triple valve 4, auxiliary reservoir 5, and brake cylinder 6, a control pipe line 7, and a signal pipe line 8. Brake valves 9 are located at opposite ends of the car and are connected to the train brake pipe 3 and control pipe line 8 in the usual manner, said pipe lines having the usual couplings at opposite ends of the car.

The feed valve device embodying my invention may be constructed as shown in Fig. 2 in which a casing 10 is provided having a piston chamber 11 containing piston 12 and valve chamber 13 connected by pipe 14 to the main reservoir 2 and containing the supply slide valve 15. The usual feed valve regulating portion is also provided comprising a diaphragm 16 subject on one side to the pressure of an adjustable spring 17 and on the opposite side to the pressure of the control pipe line, the passage 18 supplying fluid from the control pipe to said diaphragm. The diaphragm 16 is adapted to operate a valve 19 for controlling the venting of air from piston chamber 11 through a passage 20 to the control pipe passage 18. As in the prior application hereinbefore referred to, a second regulating diaphragm 21 is also provided which is subject on one side to a constant pressure such as signal line pressure supplied through pipe 22 and on the opposite side to control pipe pressure contained in passage 18. The diaphragm 21 is adapted to operate a valve 22 for controlling the venting of air from piston chamber 11 to the control pipe passage 18.

According to my present invention, a double seated movable abutment 23 is provided having one side constantly exposed to the pressure on top of valve 22 and contained in piston chamber 11, the stem of the valve 22 being loosely fitted to permit flow of air from the passage 20 to said abutment 23. The opposite side of the abutment 23 is subject to the pressure of a coil spring 24 and the chamber 25 at this side of the abutment is connected to a pipe 26, leading to a main reservoir supply pipe 27 which latter pipe extends to the opposite ends of the car and is provided with cocks 28 adjacent to each brake valve.

The cock 28 in one position admits fluid from the main reservoir to pipes 27 and 26 and in another position connects the pipe 27 to the atmosphere. In double end equipments such as shown in Fig. 1 it is desirable to provide a double check valve device 29 at the junction of pipes 27 and 26, so as to prevent main reservoir air from blowing out of the cock at one end when the cock is open at the opposite end supplying main reservoir pressure.

Within the movable abutment 23 and adapted to bear on the top of the stem of valve 22 is a spring cap 30 subject to the pressure of a spring 31.

A check valve 32 may be inserted in the pipe 22 and a small reservoir 33 may be connected to that portion of the pipe 22 adjacent the feed valve device so as to more fully insure the maintenance of a constant pressure on one side of the diaphragm 21, the reservoir serving to increase the volume of air acting on the diaphragm, so that ordinary fluctuations in pressure in the signal pipe line will not effect any substantial variation in pressure on said diaphragm.

The signal pipe line may be charged from the main reservoir 2 through a pipe 34 containing a reducing valve 35 for limiting the degree of pressure in the signal pipe. And in order to feed air to the signal pipe only on the leading car a cut out cock 36 may be provided which is opened on the leading car and closed on all the other cars. If desired, the pipe 34 above the reducing valve 35 may be connected to pipe 26 adjacent the double check valve 29, and in such case, it will be seen that air is only supplied to the signal pipe when one of the cut out cocks 28 is open and as this cock is open only on the head car, the same result is secured as by employing the cut out cocks 36.

In operation, the spring 17 of the ordinary regulating device is adjusted to a degree less than the standard pressure carried, say about ten pounds, so that under normal conditions the regulating diaphragm 16 does not control the operation of the feed valve, said diaphragm only operating when the synchronous regulating portion of the feed valve fails to act for any reason.

On the leading car, the cock 28 at the forward end is opened so that fluid from the main reservoir is supplied to chamber 25 thus balancing the fluid pressure constantly acting on the opposite side of the abutment 23. The spring 24 then shifts the abutment to its inner seat and by the movement of same the spring cap is caused to engage the stem of valve 22 and the spring 31 is thereby compressed somewhat, thus increasing the differential required to open the valve 22 by the pressure of the spring 31. The tension of spring 31 is preferably such that the valve 22 will close at two or three pounds less than the normal pressure carried in the control pipe. On the other cars, the chamber 25 is open to the atmosphere through cock 28, so that the fluid pressure on the opposite side of the piston valve 23 is sufficient to overcome the tension of spring 24 and shift the abutment 23 to its outer position. The pressure of spring 31 is thus removed from the valve 22 and consequently on cars other than the leading car, the diaphragm 21 operates the valve 22 in its usual manner when the control pipe line pressure falls a few ounces.

It will now be evident that with my improvement, the completion of the recharge of the train pipe and the auxiliary reservoirs as well as train pipe leakage is taken care of by the compressors on the cars other than the leading car, so that the leading car compressor is not operated to an excessive degree, and thus more uniform pump operation is secured.

Having now described my invention, what I claim as new and desire to secure by Letters Patent, is:

1. The combination with a source of fluid under pressure and a low pressure receptacle, of a feed valve device adapted to normally supply fluid from said source to said low pressure receptacle at a predetermined degree of pressure less than the pressure of said source and means for loading said feed valve device to thereby cause same to deliver air to the low pressure receptacle at a maximum pressure less than the normal degree of low pressure.

2. A feed valve device comprising a valve and piston for supplying fluid to an outlet, a regulating valve and diaphragm adapted to normally effect the operation of said supply valve and piston upon a predetermined reduction in the outlet pressure, and means for increasing the load on said diaphragm to thereby effect the operation of said supply valve and piston at a maximum pressure less than the normal maximum outlet pressure.

3. A feed valve device comprising a valve and piston for supplying fluid to an outlet, a regulating valve and a diaphragm subject to the opposing pressures of the outlet and a substantially constant pressure for normally effecting the operation of said supply valve and piston to supply fluid to said outlet and maintain a predetermined degree of pressure therein, and means for applying an additional load on said regulating diaphragm to render the same operative only at a degree of outlet pressure less than the normal operative pressure.

4. A feed valve device comprising a main supply valve and piston, a regulating diaphragm subject on one side to the outlet pressure, a valve operated by said diaphragm for varying the pressure on said supply piston, a valve piston normally subject on one side to fluid pressure and on the opposite side to the pressure of a spring, a load device operated by said valve device upon supplying fluid to the spring side thereof for increasing the load acting on said diaphragm.

5. A feed valve device comprising a valve mechanism operated by varying the pressure thereon for supplying fluid to an outlet, a regulating valve mechanism governed by the outlet pressure for varying the pressure on said supply valve mechanism, a load device, and a movable abutment normally subject to the opposing pressures of a spring and fluid pressure and operated upon supplying fluid under pressure to the spring side to cause said load device to exert its load upon said diaphragm.

6. The combination with a plurality of feed valve devices and a common outlet receptacle supplied with fluid under pressure thereby, of means for normally effecting the simultaneous operation of all the feed valves to maintain the outlet pressure at a predetermined degree, and a device for rendering one of the feed valve devices operative only at a different predetermined degree of pressure.

7. The combination with a plurality of feed valve devices and a common outlet receptacle supplied with fluid thereby, each feed valve device comprising a supply valve device and a regulating valve mechanism subject to the opposing pressures of the common outlet receptacle and the pressure in a common maintaining receptacle for controlling the operation of said supply valve device, of means for altering the load on the regulating valve mechanism of one feed valve device to cause said feed valve device to operate at an outlet pressure different from that of the other feed valve devices.

In testimony whereof I have hereunto set my hand.

CLYDE C. FARMER.

Witnesses:
T. A. HEDENDAHL,
B. S. JARNAGIN.

Copies of this patent may be obtained for five cents each, by addressing the "Commissioner of Patents, Washington, D. C."